United States Patent
Akoglu et al.

(10) Patent No.: US 9,171,158 B2
(45) Date of Patent: Oct. 27, 2015

(54) DYNAMIC ANOMALY, ASSOCIATION AND CLUSTERING DETECTION

(75) Inventors: Leman Akoglu, Pittsburgh, PA (US); Hanghang Tong, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 726 days.

(21) Appl. No.: 13/524,729

(22) Filed: Jun. 15, 2012

(65) Prior Publication Data
US 2014/0074796 A1 Mar. 13, 2014

Related U.S. Application Data

(60) Provisional application No. 61/569,349, filed on Dec. 12, 2011.

(51) Int. Cl.
- *G06F 15/18* (2006.01)
- *G06F 21/56* (2013.01)
- *G06F 17/30* (2006.01)
- *H04L 29/06* (2006.01)

(52) U.S. Cl.
CPC ........ *G06F 21/566* (2013.01); *G06F 17/30371* (2013.01); *G06F 17/30598* (2013.01); *G06F 21/564* (2013.01); *H04L 63/1425* (2013.01); *G06F 2221/2101* (2013.01); *G06F 2221/2117* (2013.01)

(58) Field of Classification Search
USPC .......................................................... 706/12
See application file for complete search history.

(56) References Cited

U.S. PATENT DOCUMENTS

| | | |
|---|---|---|
| 6,229,918 B1 | 5/2001 | Toyama |
| 6,826,724 B1 | 11/2004 | Shimada et al. |
| 7,072,435 B2 | 7/2006 | Metz et al. |
| 7,647,524 B2 | 1/2010 | Ide et al. |
| 7,774,363 B2 | 8/2010 | Lim |
| 7,882,128 B2 | 2/2011 | Bollinger et al. |

(Continued)

FOREIGN PATENT DOCUMENTS

| | | |
|---|---|---|
| DE | 102005049561 A1 | 4/2007 |
| WO | 2010125781 A1 | 11/2010 |
| WO | PCT/EP2012/070289 | 2/2013 |

OTHER PUBLICATIONS

Attribute clustering for grouping, selection, and classification of gene expression data Au, W.-H.; Chan, K.C.C.; Wong, Andrew K.C.; Yang Wang Computational Biology and Bioinformatics, IEEE/ACM Transactions on vol. 2, Issue: 2 DOI: 10.1109/TCBB.2005.17 Publication Year: 2005, pp. 83-101.*

(Continued)

*Primary Examiner* — Michael B Holmes
(74) *Attorney, Agent, or Firm* — Anne V. Dougherty; Ryan, Mason & Lewis, LLP

(57) ABSTRACT

Techniques are provided for dynamic anomaly, association and clustering detection. At least one code table is built for each attribute in a set of data containing one or more attributes. One or more clusters associated with one or more of the code tables are established. One or more new data points are received. A determination is made if a given one of the new data points is an anomaly. At least one of the one or more code tables is updated responsive to the determination. When a compression cost of a given one of the new data points is greater than a threshold compression cost for each of the one or more clusters, the given one of the new data points is an anomaly.

20 Claims, 14 Drawing Sheets

(56) References Cited

U.S. PATENT DOCUMENTS

| | | | |
|---|---|---|---|
| 7,925,599 B2* | 4/2011 | Koren et al. | 706/12 |
| 8,090,721 B2 | 1/2012 | Fogel | |
| 8,140,301 B2 | 3/2012 | Abe et al. | |
| 8,346,766 B2* | 1/2013 | Jamjoom et al. | 707/726 |
| 8,375,446 B2 | 2/2013 | Eiland et al. | |
| 8,478,785 B2* | 7/2013 | Jamjoom et al. | 707/790 |
| 8,612,169 B2* | 12/2013 | Lin et al. | 702/85 |
| 8,645,339 B2* | 2/2014 | Kang et al. | 707/693 |
| 8,694,979 B2* | 4/2014 | Rosu et al. | 717/156 |
| 8,694,980 B2* | 4/2014 | Rosu et al. | 717/156 |
| 8,775,335 B2* | 7/2014 | Lin et al. | 706/12 |
| 8,818,918 B2* | 8/2014 | Lin et al. | 706/12 |
| 8,903,824 B2* | 12/2014 | Akoglu et al. | 707/737 |
| 9,009,147 B2* | 4/2015 | He et al. | 707/728 |
| 2003/0093411 A1 | 5/2003 | Minor | |
| 2004/0024720 A1 | 2/2004 | Fairweather | |
| 2005/0025232 A1 | 2/2005 | Parida et al. | |
| 2005/0210151 A1 | 9/2005 | Abdo et al. | |
| 2005/0222929 A1 | 10/2005 | Steier et al. | |
| 2007/0112824 A1 | 5/2007 | Lock et al. | |
| 2007/0220030 A1 | 9/2007 | Bollinger et al. | |
| 2008/0114806 A1 | 5/2008 | Kosche | |
| 2008/0270077 A1 | 10/2008 | Ozonat et al. | |
| 2009/0018996 A1 | 1/2009 | Hunt et al. | |
| 2009/0055332 A1 | 2/2009 | Lee | |
| 2009/0089630 A1 | 4/2009 | Goldenberg et al. | |
| 2009/0150560 A1 | 6/2009 | Bestgen et al. | |
| 2010/0100774 A1 | 4/2010 | Ding et al. | |
| 2010/0107255 A1 | 4/2010 | Eiland et al. | |
| 2010/0131526 A1 | 5/2010 | Sun et al. | |
| 2011/0029469 A1 | 2/2011 | Yamada | |
| 2011/0055210 A1 | 3/2011 | Meredith et al. | |
| 2011/0178967 A1 | 7/2011 | Delp | |
| 2011/0246409 A1 | 10/2011 | Mitra | |
| 2011/0271146 A1 | 11/2011 | Mork et al. | |
| 2011/0282876 A1 | 11/2011 | Tchagang | |
| 2011/0295892 A1 | 12/2011 | Evans et al. | |
| 2011/0302194 A1 | 12/2011 | Gonzalez et al. | |
| 2012/0047123 A1 | 2/2012 | Coifman et al. | |
| 2012/0054184 A1 | 3/2012 | Masud et al. | |
| 2012/0254333 A1 | 10/2012 | Chandramouli et al. | |
| 2013/0073490 A1 | 3/2013 | Baughman et al. | |
| 2013/0138428 A1 | 5/2013 | Chandramouli et al. | |
| 2013/0159248 A1 | 6/2013 | Mueller | |
| 2013/0245793 A1 | 9/2013 | Akiyama et al. | |

OTHER PUBLICATIONS

Continuous Value Attribute Decision Table Analysis Method Based on Fuzzy Set and Rough Set Theory, Zhang Shuhong ; Sun Jianxun Fuzzy Systems and Knowledge Discovery, 2009. FSKD '09. Sixth International Conference on vol. 2 DOI: 10.1109/FSKD.2009.456 Publication Year: 2009 , pp. 75-79.*

Horizontal Aggregations in SQL to Prepare Data Sets for Data Mining Analysis Ordonez, C.; Zhibo Chen Knowledge and Data Engineering, IEEE Transactions on vol. 24, Issue: 4 DOI: 10.1109/TKDE.2011.16 Publication Year: 2012, pp. 678-691.*

Index-Based OLAP Aggregation for In-Memory Cluster Computing Wang, Yu; Ye, Xiaojun Cloud Computing and Big Data (CCBD), 2014 International Conference on DOI: 10.1109/CCBD.2014.13 Publication Year: 2014, pp. 148-151.*

A Multifaceted Perspective at Data Analysis: A Study in Collaborative Intelligent Agents, Pedrycz, W.; Rai, P. Systems, Man, and Cybernetics, Part B: Cybernetics, IEEE Transactions on Year: 2008, vol. 38, Issue: 4 pp. 1062-1072, DOI: 10.1109/TSMCB.2008.925728.*

A Performance Management System for Telecommunication Network Using AI Techniques, Shaoyan Zhang; Rui Zhang; Jianmin Jiang, Dependability of Computer Systems, 2008. DepCoS-RELCOMEX '08. Third International Conference on Year: 2008 pp. 219-226, DOI: 10.1109/DepCoS-RELCOMEX.2008.32.*

Semi-Supervised Clustering of Corner-Oriented Attributed Graphs, Jin Tang; Chunyan Zhang; Bin Luo Hybrid Intelligent Systems, 2006. HIS '06. Sixth International Conference on Year: 2006 pp. 33-33, DOI: 10.1109/HIS.2006.264916.*

Cooperative sensor anomaly detection using global information, Zhang, R.; Ji, P.; Mylaraswamy, D.; Srivastava, M.; Zahedi, S. Tsinghua Science and Technology Year: 2013, vol. 18, Issue: 3 pp. 209-219, DOI: 10.1109/TST.2013.6522580.*

K. Smets et al., "The Odd One Out: Identifying and Characterising Anomalies," http://win.ua.ac.be/adrem/bibrem/pubs/smets11a.pdf, Aug. 2011, 12 pages, Antwerpen, Belgium.

D. Basin et al., "ZISC Annual Report 2008-2009," http://www.zisc.ethz.ch/about/pubrel/ZISCAnnualReport20082009.pdf, Jan. 2009, 44 pages.

J. Vreeken et al., "Characterising the Difference," Department of Information and Computing Sciences, Utrecht University, http://www.cs.uu.nl/research/techreps/repo/CS-2007/2007-014.pdf, Aug. 2007, 11 pages, Utrecht, Netherlands.

E. Keogh et al., "Towards Parameter-Free Data Mining," University of California, www.researchgate.net, Jan. 2004, 12 pages, Riverside, California.

G. Bristow et al., "Design of a System for Anomaly Detection in HAL/S Programs," http://www.ip.com/pubview/IPCOM000150950D, Mar. 1979, 115 pages.

L.D. Fosdick et al., "The Detection of Anomalous Interprocedural Data Flow," http://www.ip.com/pubview/IPCOM000150984D, Apr. 1976, 23 pages.

Z. Guo et al., "Tracking Probabilistic Correlation of Monitoring Data for Fault Detection in Complex Systems," International Conference on Dependable Systems and Networks (DSN), Jun. 2006, pp. 259-268.

D. Johnson et al., "Compressing Large Boolean Matrices Using Reordering Techniques," Proceedings of the 30th International Conference on Very Large Data Bases (VLDB), Sep. 2004, pp. 13-23, vol. 30, Toronto, Canada.

A.L. Buchsbaum et al., "Engineering the Compression of Massive Tables: An Experimental Approach," Proceedings of the 11th ACM-SIAM Symposium on Discrete Algorithms (SODA), Jan. 2000, pp. 175-184.

U. Kang et al., "GBASE: A Scalable and General Graph Management System," 17th ACM International Conference on Knowledge Discovery and Data Mining (KDD), Aug. 2011, pp. 1091-1099.

H. Tong et al., "Colibri: Fast Mining of Large Static and Dynamic Graphs," 14th ACM International Conference on Knowledge Discovery and Data Mining (KDD), Aug. 2008, pp. 686-694.

J. Sun et al., "Less is More: Compact Matrix Decomposition for Large Sparse Graphs," 7th SIAM International Conference on Data Mining (SDM), Apr. 2007, pp. 366-377.

J. Sun et al., "GraphScope: Parameter-Free Mining of Large Time-Evolving Graphs," 13th ACM International Conference on Knowledge Discovery and Data Mining (KDD), Aug. 2007, pp. 687-696.

B. Cao et al., "Detect and Track Latent Factors with Online Nonnegative Matrix Factorization," 20th International Joint Conference on Artificial Intelligence (IJCAI), Jan. 2007, pp. 2689-2694.

F. Wang et al., "Efficient Document Clustering via Online Nonnegative Matrix Factorizations," 11th SIAM International Conference on Data Mining (SDM), Apr. 2011, pp. 908-919.

J. Sun et al., "Neighborhood Formation and Anomaly Detection in Bipartite Graphs," 5th IEEE International Conference on Data Mining (ICDM), Nov. 2005, pp. 418-425.

L. Akoglu et al., "OddBall: Spotting Anomalies in Weighted Graphs," 14th Pacific-Asia Conference on Advances in Knowledge Discovery and Data Mining (PAKDD), Part II, Jun. 2010, pp. 410-421, Hyderabad, India.

C.C. Noble et al., "Graph-Based Anomaly Detection," 9th ACM International Conference on Knowledge Discovery and Data Mining (KDD), Aug. 2003, pp. 631-636.

Deepayan Chakrabarti, "AutoPart: Parameter-Free Graph Partitioning and Outlier Detection," 8th European Conference on Principles and Practice of Knowledge Discovery in Databases (PKDD), Sep. 2004, pp. 112-124, Pisa, Italy.

(56) References Cited

OTHER PUBLICATIONS

D.D. Lee et al., "Algorithms for Non-Negative Matrix Factorization," Advances in Neural Information Processing Systems (NIPS), 2000, pp. 556-562.

A. Banerjee et al., "A Generalized Maximum Entropy Approach to Bregman Co-Clustering and Matrix Approximation," 10th ACM International Conference on Knowledge Discovery and Data Mining (KDD), Aug. 2004, pp. 509-514.

C.H.Q. Ding et al., "Convex and Semi-Nonnegative Matrix Factorizations," IEEE Transactions on Pattern Analysis and Machine Intelligence, Jan. 2010, pp. 45-55, vol. 32, No. 1.

U.S. Appl. No. 13/094,724, filed in the name of H. Tong et al. Apr. 26, 2011 and entitled "Method and Apparatus for Detecting Abnormal Behaviors on Large Bi-Partite Graphs."

U.S. Appl. No. 13/198,790, filed in the name of F. Wang et al. Aug. 5, 2011 and entitled "Method and Apparatus for Privacy-Aware On-Line User Role Tracking."

\* cited by examiner

FIG. 2

Table 202:

| | GRADE | AGE | HOBBY | MOOD |
|---|---|---|---|---|
| #1 | A | B | C | X |
| #2 | A | B | C | X |
| #3 | A | B | C | X |
| #4 | A | B | D | X |
| #5 | A | B | D | Y |
| #6 | A | B | D | Y |
| #7 | A | B | D | Z |

203-1:

| CODE WORD | BIT LENGTH | USAGE |
|---|---|---|
| A | ▇ | 7 |

203-2:

| CODE WORD | BIT LENGTH | USAGE |
|---|---|---|
| B | ▇ | 7 |

203-3:

| CODE WORD | BIT LENGTH | USAGE |
|---|---|---|
| C | ▇ | 3 |
| D | ▇ | 4 |

203-4:

| CODE WORD | BIT LENGTH | USAGE |
|---|---|---|
| X | ▇ | 4 |
| Y | ▇ | 2 |
| Z | ▇ | 1 |

FIG. 3

| | GRADE | AGE | HOBBY | MOOD |
|---|---|---|---|---|
| #1 | A | B | C | X |
| #2 | A | B | C | X |
| #3 | A | B | C | X |
| #4 | A | B | D | X |
| #5 | A | B | D | Y |
| #6 | A | B | D | Y |
| #7 | A | B | D | Z |

202

| CODE WORD | BIT LENGTH | USAGE |
|---|---|---|
| ABC | | 3 |
| ABD | | 4 |

303-1

| CODE WORD | BIT LENGTH | USAGE |
|---|---|---|
| X | | 4 |
| Y | | 2 |
| Z | | 1 |

| |
|---|
| Algorithm 1 Multi-Krimp |
| Input: $n \times f$ data points vs. (categorical) features data matrix |
| Output: A set of code tables, $C_1,...,C_k$, and total compression cost in bits |
|     {*Builds a compression model using a bottom-up approach of merging CTs that yield a lower total cost. The resulting table(s) can have various length feature sets.*} |
| 1: Start with a separate (elementary) $CT_i$ for each feature $F_i$. |
| 2: Compute total cost with $f$ elementary $CT$s using Equation 6 |
| 3: repeat |
| 4:   Compute the Information Gain (IG) between all pairs of feature groups |
| 5:   for each pair of feature groups $S_i$ and $S_j$ in decreasing order of IG-per-feature do |
| 6:     Put all the feature sets from $CT_i$ and $CT_j$ into a new $\widehat{CT}_i|_j$ |
| 7:     Sort feature sets in $\widehat{CT}_i|_j$ (1) by length and (2) by usage |
| 8:     Find the unique rows (feature sets) in the database induced on features $S_i|S_j$ |
| 9:     for each unique row $s_i|_{j,x}$ in decreasing order of frequency do |
| 10:       Insert $s_i|_{j,x}$ to new $\widehat{CT}_i|_j$ |
| 11:       Decrease usages of all existing overlapping feature sets by its frequency |
| 12:       Remove feature sets with length > 1 and usage = 0 |
| 13:       Recompute code word lengths with the new usages |
| 14:       if total cost is reduced then |
| 15:         Store $CT_i|_j \leftarrow \widehat{CT}_i|_j$ |
| 16:       end if |
|         {*else, continue insertions from step 9 for possible reduced cost*} |
| 17:     end for |
| 18:     if the total cost in NOT reduced with any insertions then |
| 19:       Discard new $CT_i|_j$, continue from step 5 |
| 20:     else |
| 21:       Accept new $CT_i|_j$, (merge), go to step 4 |
| 22:     end if |
| 23:   end for |
| 24: until convergence, i.e. no more merges |

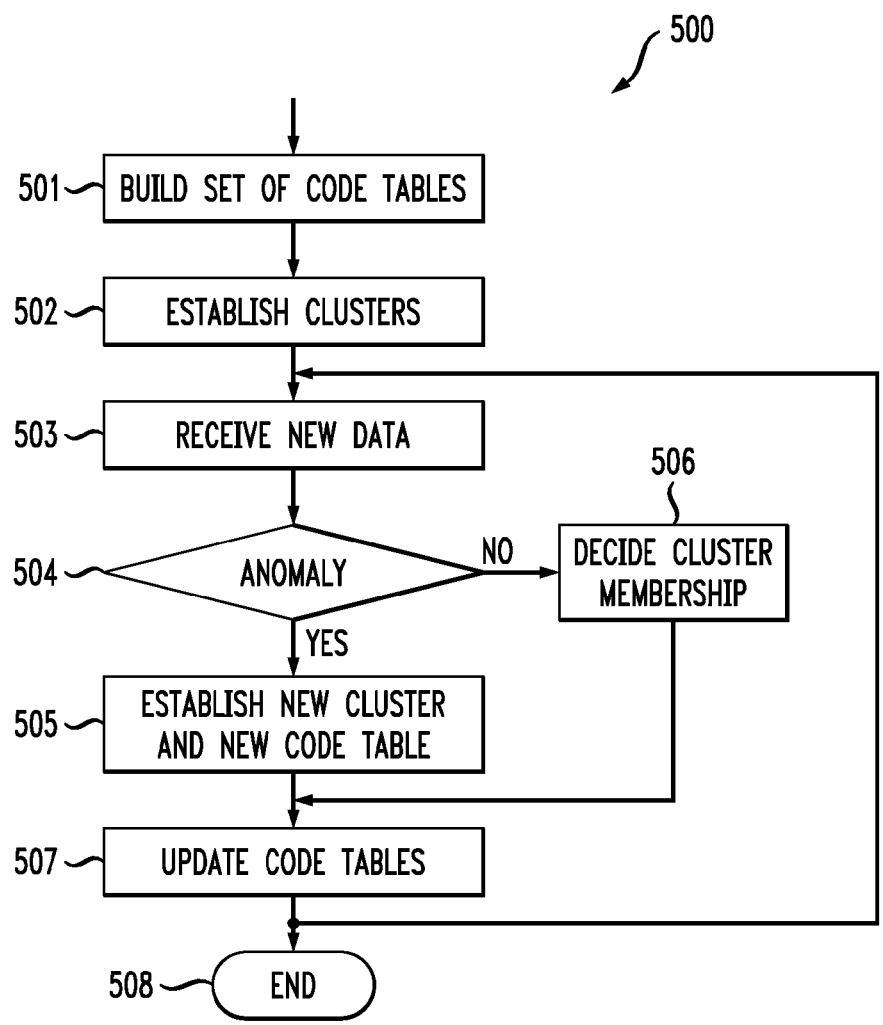

FIG. 6

Table 601:

| | GRADE | AGE | HOBBY | MOOD |
|---|---|---|---|---|
| #1 | A | B | C | X |
| #2 | A | B | C | X |
| #3 | A | B | C | X |
| #4 | A | B | D | X |
| #5 | A | B | D | Y |
| #6 | A | B | D | Y |
| #7 | A | B | D | Z |

Table 602-1:

| CODE WORD | BIT LENGTH | USAGE |
|---|---|---|
| ABC | ▨ | 3 |
| ABD | ▨ | 4 |

Table 602-2:

| CODE WORD | BIT LENGTH | USAGE |
|---|---|---|
| X | ▨ | 4 |
| Y | ▨ | 2 |
| Z | ▨ | 1 |

Table 604 (604-1, 604-2; 603-1):

| #1 | #2 | #3 | #4 | #5 | #6 | #7 |
|---|---|---|---|---|---|---|
| 1 | 1 | 1 | | | | |
| | | | 1 | 1 | 1 | 1 |

Table 605 (605-1, 605-2, 605-3; 603-2):

| #1 | #2 | #3 | #4 | #5 | #6 | #7 |
|---|---|---|---|---|---|---|
| 1 | 1 | 1 | 1 | | | |
| | | | | 1 | 1 | |
| | | | | | | 1 |

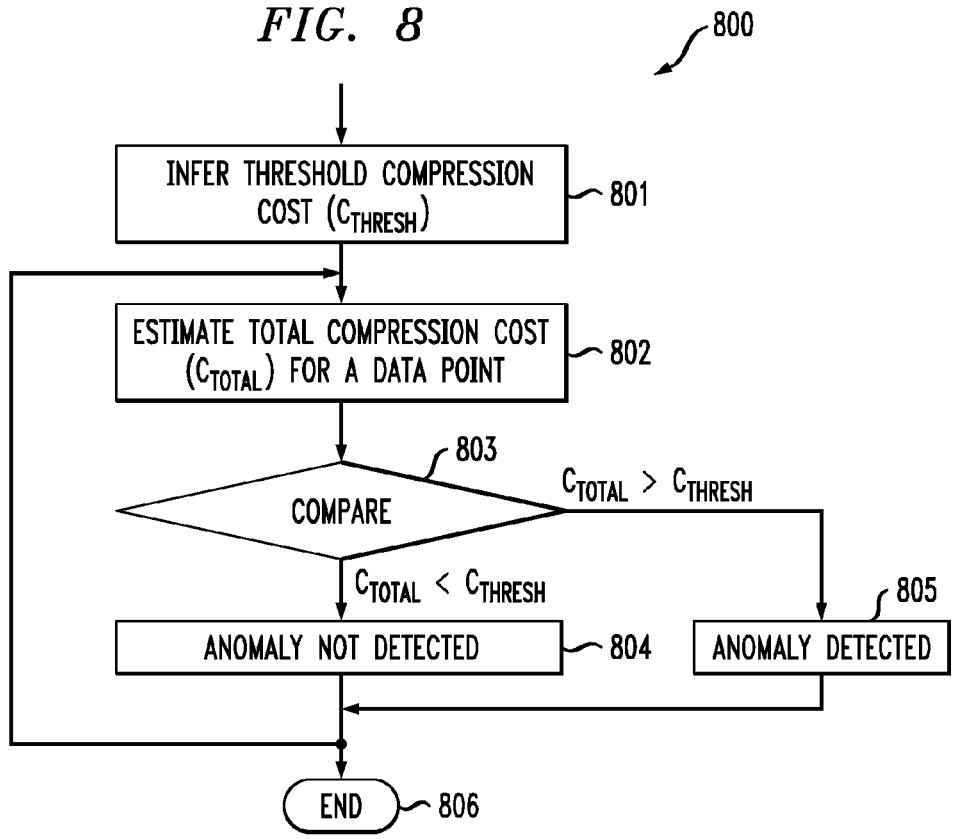

| Algorithm 2 IsAnomaly |
|---|
| Input: A set of code tables $C_1,...,C_k$, newcoming data point $d$<br>Output: True (Flag anomaly) or False (Updated code tables $C_1,...,C_k$)<br>1: Compute $score(d)$ using Equation 8<br>2: if $score(d) > \theta + 3 * std$ then<br>3:    return True<br>4: else<br>5:    $\sum_{i \in 1,...,k} \sum_{s \in cover(d_{s_i})} usage(s|CT_i) \leftarrow usage(s|CT_i) + 1$<br>6:    Recompute code word lengths with the updated *usages* using Equation 2<br>   end if |

FIG. 10

Table 601':

| | GRADE | AGE | HOBBY | MOOD |
|---|---|---|---|---|
| #1 | A | B | C | X |
| #2 | A | B | C | X |
| #3 | A | B | C | X |
| #4 | A | B | D | X |
| #5 | A | B | D | Y |
| #6 | A | B | D | Y |
| #7 | A | B | D | Z |
| #8 | A | B | D | Z |
| #9 | A | B | D | Z |
| #10 | A | B | E | Z |

Table 1002-1:

| CODE WORD | BIT LENGTH | USAGE |
|---|---|---|
| ABC | ▓ | 3 |
| ABD | ▒ | 6 |
| ABE | ▓▓ | 1 |

Table 1002-2:

| CODE WORD | BIT LENGTH | USAGE |
|---|---|---|
| X | ▪ | 4 |
| Y | ▓ | 2 |
| Z | ▪ | 4 |

Table (1004-1, 1004-2, 1004-3 / 1003-1):

| | #1 | #2 | #3 | #4 | #5 | #6 | #7 | #8 | #9 | #10 |
|---|---|---|---|---|---|---|---|---|---|---|
| | 1 | 1 | 1 | | | | | | | |
| | | | | 1 | 1 | 1 | 1 | 1 | 1 | |
| | | | | | | | | | | 1 |

Table (1005-1, 1005-2, 1005-3 / 1003-2):

| | #1 | #2 | #3 | #4 | #5 | #6 | #7 | #8 | #9 | #10 |
|---|---|---|---|---|---|---|---|---|---|---|
| | 1 | 1 | 1 | 1 | | | | | | |
| | | | | | 1 | 1 | | | | |
| | | | | | | | 1 | 1 | 1 | 1 |

FIG. 12A

Algorithm 3 Co-Part

Input: $n \times f$ data points vs. (categorical) features data matrix
Output: number of data and feature groups $(k^*, l^*)$, group assignments $(K^*, L^*)$, a set of code tables $CT^*_{ij}$, $i = \{1,...,k\}$, $j = \{1,...,l\}$ and total compression cost in bits 1: Set $k^0 = 1$, $l^0 = f$ as we start with a single data and $f$ feature groups.
2: Set $K^0 := \{1, 2,...,n\} \rightarrow \{1, 1,...,1\}$
3: Set $L^0 := \{1, 2,...,f\} \rightarrow \{1, 2,...,f\}$
4: Start with a separate (elementary) $CT_{1,i}$ for each feature $F_i$.
5: Compute total cost with $f$ elementary $CT$s using Equation 6
6: repeat
7:    $L^{T+1}$, $l^{T+1}$, $CT^{T+1}$ := Merge-FeatureGroup: try to merge a pair of feature groups.
8:    $K^{T+1}$, $k^{T+1}$, $CT^{T+1}$ := Split-NodeGroup: try to split a node group into two.
9:    $K^{T+1}$, $CT^{T+1}$ := Re-Assign: reassign each data point to a data group that gives lowest encoding cost
10:    if there is no decrease in total cost then
11:       return $(k^*, l^*) = (k^T, l^T)$, $(K^*, L^*) = (K^T, L^T)$, $CT^* = CT^T$
12:    else
13:       Set $T = T + 1$
14:    end if
15: until convergence

Algorithm 4 Merge-FeatureGroup

---

Input: $n \times f$ data points vs. features data matrix, $(K^T, L^T)$, $l^T$, $CT^T$
Output: $CT^{T+1}$, $L^{T+1}$, $l^{T+1}$ 1: Compute $cost^T$ of all data groups $g$ with current code tables $CT^T$
2: Compute the Information Gain (IG) between all pairs of feature groups
3: for each pair of feature groups $S_i$ and $S_j$ in decreasing order of IG-per-feature do
4:     $cost^{T+1} \leftarrow 0$
5:     for each data group $g$ do
6:        Put all the feature sets from $CT_{g,i}$ and $CT_{g,j}$ into a new $\widehat{CT}_{g,i|j}$
7:        Sort feature sets in $\widehat{CT}_{g,f|j}$ (1) by length and (2) by usage
8:        Find the unique rows (feature sets) in the data group $g$ induced on features $S_i | S_j$
9:        for each unique row $s^g_{i|j,x}$ in decreasing order of frequency do
10:           Insert $s^g_{i|j,x}$ to new $\widehat{CT}_{g,i|j}$
11:           Decrease usages of all existing overlapping feature sets by its frequency
12:           Remove feature sets with length > 1 and usage = 0
13:           Recompute code word lengths with the new usages
14:           if total cost for data group $g$ is reduced then
15:              Store $CT^{T+1}_{g,i|j} \leftarrow \widehat{CT}_{g,i|j}$
16:           end if
17:        end for
18:        Add new total cost of group $g$ to $cost^{T+1}$
19:     end for
20:     if $cost^{T+1} < cost^T$ then
21:        Accept merge: $CT^{T+1}$, $L^{T+1}_i = L^{T+1}_j \leftarrow L^T_i$, $l^{T+1} = l^T - 1$
22:        return
23:     end
24:        Discard all new $CT^{T+1}_{g,i|j}$
25:     end if
26: end for

FIG. 12C

Algorithm 5 Split-NodeGroup

Input: $n \times f$ data points vs. features data matrix, $(K^T, L^T)$, $k^T$, $CT^T$
Output: $CT^{T+1}$, $K^{T+1}$, $k^{T+1}$
1: Split the data group $g$ with the maximum bit-cost per-datapoint
2: for each data point $d$ in data group $g$ do
3:    if removal of $d$ from group $g$ decreases the per-datapoint bit-cost of $g$ then
4:       Place $d$ into new data group: $K_d^{T+1} = k^T + 1$
5:       Decrease usage of feature sets in cover of $d$ from all $CT_{g,:}$ and update code word lengths.
6:    end if
7: end for
8: if size of new data group is greater than 0 then
9:    $k^{T+1} = k^T + 1$
10:   Find a new code table for new data group using current feature groups $L^T$
11: end if

FIG. 12D

Algorithm 6 Re-Assign

Input: $n \times f$ data points vs. features data matrix, $(K^T, L^T)$, $CT^T$
Output: $CT^{T+1}$, $K^{T+1}$
1: repeat
2:   for each data point $d$ in database $D$ do
3:      Assign $d$ to data group $\hat{g}$ with code tables $\widehat{CT}_{\hat{g},:}$ that give minimum encoding cost for $d$, $K_d^{T+1} := \hat{g}$
4:      Update usages of feature sets in cover of $d$ in both code tables $CT_{K_d^T,:}$ and $CT_{K_d^{T+1},:}$ as well as code word lengths
5:   end for
6: until no re-assignments

DYNAMIC ANOMALY, ASSOCIATION AND CLUSTERING DETECTION

CROSS-REFERENCE TO RELATED APPLICATIONS

The present application claims the benefit of U.S. Provisional Application No. 61/569,349, filed Dec. 12, 2011, the disclosure of which is incorporated by reference herein. The present application is also related to commonly-assigned U.S. Patent Application 13/524,773, entitled "Anomaly, Association and Clustering Detection," filed concurrently herewith and incorporated by reference herein.

FIELD

The field of the invention relates to anomaly, association and clustering detection and, more particularly, to techniques for dynamically detecting anomalies, co-association, and contextual clustering from data.

STATEMENT OF GOVERNMENT RIGHTS

This invention was made with government support under Contract No.: W911NF-11-C-0200 awarded by Defense Advanced Research Projects Agency (DARPA). The government has certain rights in this invention.

BACKGROUND

The efficient processing and monitoring of large amounts of data for anomalies, associations, and clusters is becoming increasingly important as governments, businesses, entities and individuals store and/or require access to growing amounts of data.

This data is often stored in databases. Effectively monitoring data for anomalies, association and clustering has numerous applications. Examples of such applications include network intrusion detection, credit card fraud, calling card fraud, insurance claim and accounting inefficiencies or fraud, electronic auction fraud, cargo shipment faults, and many others. In addition to revealing suspicious, illegal or fraudulent behavior, anomaly detection is useful for spotting rare events, as well as for the vital task of data cleansing or filtering.

Traditional approaches to anomaly, association and clustering detection have focused on numerical databases, while approaches for categorical databases are few. Typically, numerical databases can be converted into categorical form, but categorical databases are often difficult and expensive to convert into numerical form.

SUMMARY

Embodiments of the invention provide techniques for dynamic anomaly, association and clustering detection.

For example, in one embodiment, a method comprises the following steps. At least one code table is built for each attribute in a set of data containing one or more attributes. One or more clusters associated with one or more of the code tables are established. One or more new data points are received. A determination is made if a given one of the new data points is an anomaly. At least one of the one or more code tables is updated responsive to the determination. At least one of the building, establishing, receiving, determining and updating steps are performed by a processor device.

Further embodiments of the invention comprise one or more of the following features.

The determining step comprises estimating a threshold compression cost for each of the one or more clusters, calculating the compression cost of the given one of the new data points for each of the clusters, and comparing the compression cost of the given one of the new data points with the threshold compression cost for each of the one or more clusters. When the compression cost of the given one of the new data points is greater than the threshold compression cost for each of the one or more clusters, the given one of the new data points is an anomaly.

The method further comprises the step of tracking the detection of anomalies over a period of time. The determining step is based at least in part on the tracked detection of anomalies.

The step of establishing one or more clusters comprises creating a matrix of data points and code words for each of the one or more code tables and inferring at least one data cluster from at least one of the matrices.

Advantageously, one or more embodiments of the invention allow for efficient dynamic anomaly, association and clustering detection in databases using dictionary based compression.

These and other embodiments of the invention will become apparent from the following detailed description of illustrative embodiments thereof, which is to be read in connection with the accompanying drawings.

BRIEF DESCRIPTION OF THE DRAWINGS

FIG. 2 illustrates an example of elementary code tables for a data table, according to an embodiment of the invention.

FIG. 3 illustrates an example of merged code tables for a data table, according to an embodiment of the invention.

FIG. 4 illustrates an algorithm for creating a set of code tables, according to an embodiment of the invention.

FIG. 5 illustrates a methodology for dynamic anomaly and cluster detection, according to an embodiment of the invention.

FIG. 6 illustrates an example of clustering detection, according to an embodiment of the invention.

FIG. 8 illustrates a methodology for dynamic anomaly detection, according to an embodiment of the invention.

FIG. 9 illustrates an algorithm for dynamic anomaly detection, according to an embodiment of the invention.

FIG. 10 illustrates an example of dynamic clustering detection, according to an embodiment of the invention.

FIGS. 12A-12D illustrate an algorithm for dynamic association detection, according to an embodiment of the invention.

DETAILED DESCRIPTION

Illustrative embodiments of the invention may be described herein the context of an illustrative method of dynamic anomaly, association and/or clustering detection in a database. However, it is to be understood that embodiments of the invention are not limited to the illustrative databases or methods described but are more broadly applicable to other suitable methods, databases and data storage systems.

Embodiments of the invention address the problem of dynamic anomaly detection in categorical databases using dictionary based compression. One or more embodiments of the invention use compression as an efficient way to spot anomalies, association and clustering. The norm of the data in a database defines the patterns that compress the database well, and thus any data point that cannot be compressed well can be defined as abnormal (i.e., anomalous, extreme, rare, interesting, suspicious, outlier, etc.).

One or more embodiments of the invention may be implemented in a method, referred to as Multi-Krimp in this description. The Multi-Krimp technique uses a collection of dictionaries to encode a given database. Dictionaries may also be referred to as code tables in this description. Multi-Krimp exploits correlations between the features in a database, groups the features that have high information gain together, and builds a dictionary for each group of features. The dictionaries capture the frequent patterns in a given database, and the higher the frequency of a pattern, the shorter its encoding length becomes. Multi-Krimp finds the optimal set of dictionaries that yields the minimum total encoding (compression) cost in bits.

One key feature of the Multi-Krimp approach is that it is parameter free; it employs the Minimum Description Length (MDL) principle to handle the trade-off between the savings in bits from encoding features in groups and the overhead in bits from having a possible larger dictionary for a group of features. Therefore, the number of groups as well as the assignment of features to groups is decided automatically.

MDL is a model selection criteria based on lossless compression principles. More specifically, given a set of models $\mathcal{M}$, MDL selects the best (MDL-optimal) model $M \in \mathcal{M}$ which minimizes:

$$L(M)+L(D|M), \quad (1)$$

in which L(M) is the length in bits of the description of model M, and L(D|M) is the length of the description of the data, encoded by M. Therefore, the MDL-optimal compressor for a database D encodes D most succinctly among all possible compressors.

In order to use the MDL principle in the Multi-Krimp approach, it is necessary to define the collection of models and how to encode the data with a model and encode the model itself. The Multi-Krimp approach takes a dictionary, or look-up/code table, based compression approach to encode a given database.

Figure 1:
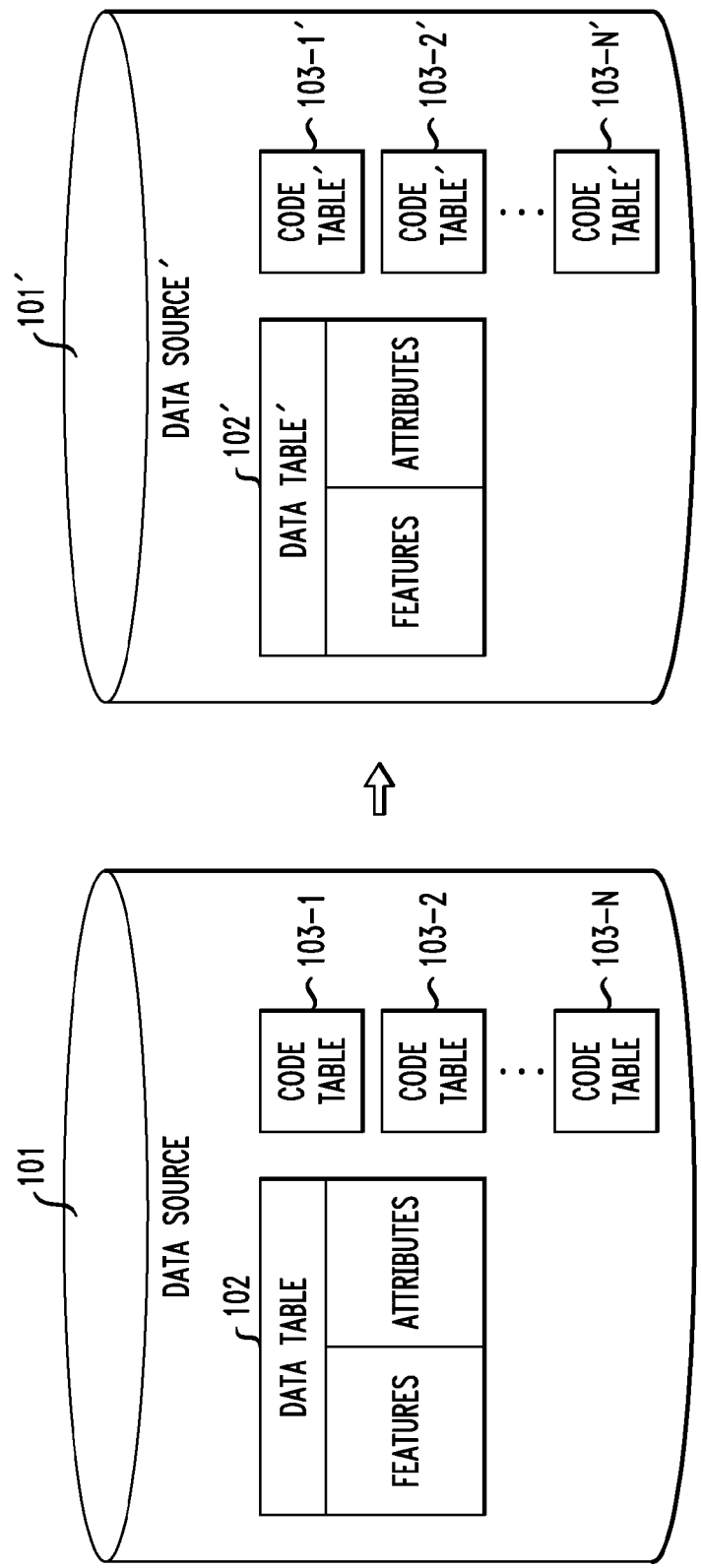
FIG. 1 illustrates an example of updating a data source using dictionary based compression, according to an embodiment of the invention.

FIG. 1 illustrates an example of dynamic update of a data source using dictionary based compression. In FIG. 1, a data source 101 is encoded into a data table 102 and code tables 103-1 through 103-N. It is important to note that while FIG. 1 shows only a single set of data 101 and a single data table 102, other configurations are possible. For example, a given set of data may be split into multiple data tables, each with a corresponding set of code tables. As another example, more than one set of data may be encoded into a single data table or multiple data tables. Embodiments of the invention described herein will generally refer to a set of data 101 which is encoded into a single data table 102 and one or more code tables 103 for clarity purposes. As new data is received, the existing data source is updated. FIG. 1 shows an updated data store 101', with a corresponding updated data table 102' and updated code tables 103-1' through 103-N'.

FIG. 2 illustrates one example of a data table 202 and a set of code tables 203-1 through 203-4. Each of the code tables 203 has three columns, although in some embodiments different numbers of columns are possible. For example, each code table may comprise two columns. A first column may contain code words and a second column may contain feature sets. Feature sets have a length and support or usage. In FIG. 2, the length and usage are shown as two separate columns, but in other embodiments the length and usage may be combined in a single column. Each attribute or feature is encoded as a code word. For example, in FIG. 2, A is the encoding of fifth grade, B is the encoding of age 10, C and D are the encoding of hobbies such as football and baseball, and X, Y and Z are the encoding of moods such as happy, sad, and angry. Bit length refers to the number of bits required to encode a feature such as the fifth grade as code word A. The usage refers to the number of times a particular feature occurs in the data set. #1-#10 refer to different data points. In the example of FIG. 2, each of #1-#10 refer to a particular student.

The following is a description of how to encode a database using a single code table. For a code table CT, feature sets are ordered by length and support. The support of a feature set s in a database D is simply $|d \in D|s \subseteq d|$. The length of a code word of a feature set depends on the database that is compressed. The more often a code word is used, the shorter its length should be. This is shown in the code tables 203 of FIG. 2, where the code words with the highest usage have the shortest length. The usage of a feature set $s \in CT$ is the number of data points $d \in D$ which have s in their encoding (i.e., cover). The encoding of a data point d using CT works as follows: the feature sets are scanned in their predefined order to find the first feature set s for which $s \subseteq d$. The corresponding code word for s in the code word column becomes a part of the cover of d. If $d \backslash s \neq 0$, the encoding continues with $d \backslash s$ and yields a unique encoding (set of features) for d.

Given the usages of the feature sets in a code table, the lengths of the code words can be computed using the Shannon entropy from information theory. The Shannon entropy gives the optimal length for a prefix code s as $$L(s|CT) = -\log_2(Pr(s|D)) = -\log_2\left(\frac{usage(s)}{\sum_{\hat{s} \in CT} usage(\hat{s})}\right). \quad (2)$$

The compression cost of the encoding of a data point is simply the sum of the code lengths of the feature sets in its cover, that is, $$L(d|CT) = \sum_{s \in cover(d)} L(s|CT). \quad (3)$$

The total length in bits of the encoded database is then the sum of the lengths of the encoded data points.

$$L(D|CT) = \sum_{d \in D} L(d|CT). \quad (4)$$

To find the MDL-optimal compressor, the compressed size of the database and the size of the code table must be taken into account. The size of the code word column in a given code table CT that contains the prefix code word s is the sum of their lengths. For the size of the features set column, all the singleton items $\mathcal{I}$ in the feature set must be considered. For the encoding of these individual items, the frequency of their appearance in the feature set column is calculated. Arithmetic encoding is used for their optimal compression cost. Specifically, the encoding of a feature set column in a code table requires cH (P) bits, where c is the total count of singleton items in the features sets, H(.) denotes the Shannon entropy function, and P is a multinomial random variable with the probability $$p_i = \frac{r_i}{c}$$

in which $r_i$ is the number of occurrences of a singleton item i in the feature set column. In some embodiments, an ASCII table providing the matching from the (arithmetic) codes to the original names may be provided for the actual items. Since all such tables are over $\mathfrak{T}$, this only adds an additive constant to the total cost. The length of a code table is thus $$L(CT) = \sum_{s \in CT} L(s \mid CT) + \sum_{s \in \mathfrak{T}} -r_i \log_2(p_i). \qquad (5)$$

The Multi-Krimp approach used in embodiments of the invention uses multiple code tables, rather than a single code table as described above. A set of data points in a multi-dimensional feature space may be highly correlated (have high information gain) and thus can compress well together. By exploiting correlations among feature groups and building a separate code table for each partitioning of features, Multi-Krimp improves on the above approach which uses a single code table. FIG. 3 shows an example of how feature groups may be used to improve on an approach using a single code table. Code table 303-1 of FIG. 3 shows that the features of grade, age and hobby in data table 202 are grouped together to exploit correlations of these features. As shown in code table 303-1, the bit length required to encode these feature groups is smaller than that required using the code tables 203 in FIG. 2 where no features are grouped.

The object of the Multi-Krimp approach is to minimize a compression cost for a set of data. For example, let F be a set of features and let D be a set of data points (a database) over F (i.e., d∈D is a F dimensional feature vector). The goal is to find a grouping $S_1, S_2, \ldots, S_k$ of F and a set of associated code tables $CT_1, CT_2, \ldots, CT_k$ such that the total compression cost in bits is minimized $$\sum_{i \in 1, \ldots, k} L(CT_i) + \sum_{d \in D} \sum_{i \in 1, \ldots, k} L(d_{S_i} \mid CT_i), \qquad (6)$$

Where $d_{S_i}$ denotes the part of data point d induced on feature subspace $S_i$.

The number of feature groups k is not a parameter of the Multi-Krimp approach, but rather is determined by MDL. In particular, MDL ensures that there will not be two separate code tables for a pair of highly correlated features as it would yield lower data cost to encode them together. On the other hand, combining feature groups may yield larger code tables, that is higher model cost, which may not compensate for the savings from the data cost. In other words, Multi-Krimp groups features for which the total encoding cost given in (6) is reduced. MDL is used to find which features to group together as well as how many groups there should be.

The search space for finding the optimal code table for a given set of features, yet alone for finding the optimal grouping of features is very large. Finding the optimal code table for a set of $|S_i|$ features involves finding all the possible feature sets with different value combinations up to length $|S_i|$ and choosing a subset of those feature sets that would yield the minimum total cost on the part of the database induced on $S_i$. Furthermore, the number of possible groupings of a set of f features is the well-known Bell number $B_f$. While the search space is prohibitively large, it does not have a structure or exhibit monotonicity properties which could help prune it. As a result, Multi-Krimp is a heuristic algorithm.

The basic methodology of Multi-Krimp is now described. Given a set of data in a data table, a code table is built for each feature (attribute) in the data table. These initial code tables may be referred to as elementary code tables. Next, two code tables are selected and merged. A determination is made as to whether to accept or reject the merged code table. If a determination is made to accept the merged code table, the merged code table is stored with the elementary code tables and may be selected in a future iteration. If a determination is made to reject the merged code table, the merged code table is discarded. These steps are repeated as directed using an MDL principle. Once the elementary code tables have been merged into the number of attribute groups specified by the MDL principle, the process ends.

FIG. 4 shows a pseudocode example of the Multi-Krimp algorithm, which will be discussed in detail with reference to lines of the FIG. 4 algorithm. In order to build a model with multiple code tables, a bottom-up, iterative approach is used. The algorithm starts with a separate code table $CT_i$ for each feature $F_i$ (FIG. 4, line 1). As its feature sets, each $CT_i$ contains all the unique values (length-1) $f_{i,1}, \ldots, f_{i,n_i}$ that feature $F_i$ takes, where $n_i$ denotes the count of these feature sets. The usages are simply set to the number of occurrences of each unique value in the dataset under the corresponding feature subspace. The starting cost is then the total cost of compressing all the CTs plus the compression cost of the data using these CTs (FIG. 4, line 2).

As is often the case, some features of data points are highly correlated (e.g., the age of a car and its fuel efficiency, the weather temperature and flu outbreaks, etc.). In such cases, it may be advantageous to group these features together with one CT as it would be far less costly to combine them than to encode them separately.

Given two sets of random variables (in this example feature groups) $S_i$ and $S_j$, the average number of bits saved when compressing $S_i$ and $S_j$ together instead of separately is the information gain (IG)

$$IG(S_i, S_j) = H(S_i) + H(S_j) - H(S_i, S_j) \geq 0, \qquad (7)$$

in which H(.) denotes the Shannon entropy. In fact, the IG of two sets of variables is always non-negative (zero when the variables are independent from each other), which implies that the data cost would be the smallest if all the features were represented by a single CT. On the other hand, the objective function (6) also includes the compression cost of the CT(s). Having a large CT with many (possibly uncorrelated) features might require more bits for model cost than the savings in bits it would give in data cost. Therefore, the algorithm uses IG as a guide to point out good candidate feature sets to be merged, and essentially employs MDL to decide whether the total cost is reduced and whether or not to approve the merge.

The iterative process begins by computing the IG matrix (FIG. 4, line 3) for the current feature groups, which is a positive and symmetric matrix (FIG. 4, line 4). All the pairs of feature groups are sorted with decreasing IG-per-feature (i.e., normalized by cardinality). Outer iterations start to go over these pairs as the candidate CTs to be merged (FIG. 4, line 5). For example, take $CT_i$ and $CT_j$. The construction of the new $CT_{i|j}$ works by inserting all existing feature sets $s_{i,1}, \ldots, s_{i,n_i}$ and $s_{j,1}, \ldots, s_{j,n_j}$ from both CTs into the new $CT_{i|j}$ (FIG. 4, line 6). The feature sets are sorted by length and usage (FIG. 4, line 7). Let $|S_i|$ denote the cardinality (i.e., the number of features in the feature set $S_i$.

Next, all the unique rows of the database induced on the concatenated feature subspace $S_i|S_j$ are found (FIG. 4, line 8). These length-$(|S_i|+|S_{i|j}|)$ feature sets are sorted in decreasing order of their occurrence in the database and constitute the candidates to be inserted into the new CT. Let $s_{i|j,1}, \ldots, s_{i|j,n_{ij}}$ denote these feature sets of the combined group $S_{i|j}$ in their sorted order. In inner iterations (FIG. 4, line 9), the algorithm tries to insert these one-by-one (FIG. 4, line 10), update (decrease) the usages of the existing overlapping feature sets (FIG. 4, line 11), remove those feature sets with length greater than 1 and whose usage drops to zero (keep all length-1 feature sets so as to compress any possible data point) (FIG. 4, line 12), recompute the code lengths with the updated usages (FIG. 4, line 13) and compute the total cost after each insertion. If the total cost is reduced, the current $CT_{i|j}$ is stored in another variable, otherwise iterations with the next feature set in the list is inserted for possible future cost reduction (FIG. 4, lines 14-16).

During the inner iterations, the algorithm may try to insert all the candidates or stop after a certain number of iterations have not improved the total cost any further for speed. In any stop case, if there have been no successful insertions that reduced the total cost, then the merge is rejected and the new $CT_{i|j}$, is discarded. Otherwise the new $CT_{i|j}$ is added to the collection of the current CTs after $CT_i$ and $CT_j$ are dropped. The IG between the new feature group and the rest are computed and the algorithm continues to search for possible merges. The search terminates when there are no more pairs of feature groups that can be merged for reduced cost.

In the FIG. 4 implementation of Multi-Krimp, the most computationally demanding steps are (1) finding the unique rows in the database under a particular feature subspace when two feature groups are to be merged (FIG. 4, line 8) and (2) after each insertion of a new unique row to the code table, finding the overlapping feature sets the usages of which is to be decreased (FIG. 4, line 11).

In some embodiments, no particular data structure is used and instead an integer vector of usages is kept. In such a case, step (1) above needs to performed on the fly scanning the entire database once and possibly using many linear scans and comparisons over the unique rows found so far in the process. Step (2) above would thus require a linear scan over the feature sets in a code table for each new insertion. The total computational complexity of these linear searches depends on the database, however, with the outer and inner iteration levels this may become computationally infeasible for very large databases.

In other embodiments, a sparse matrix C for feature sets versus data points is used instead of an integer vector of usages. The binary entries $c_{ji}$ in the sparse matrix C indicate whether data point i contains feature set j in its cover. The row sum of the C matrix gives the usages of the feature sets. Using matrix C, step (1) above works as follows. Say that feature groups $S_i$ and $S_j$ are to be merged. Let $C_i$ denote the $f_i \times n$ matrix for $CT_j$. The number of usages of unique rows (merged feature sets) in the database under the merged feature subspace $S_i|S_j$ is obtained by multiplying $C_i$ and $C_j^T$ into a $f_i \times f_j$ matrix I, which is an $O(f_i n f_j)$ operation. Note that the actual number of occurrences of the merged feature sets in the database is an upper bound on the usages obtained by this multiplication, however it still serves as a good approximation for the FIG. 4 algorithm.

In certain embodiments of the invention, the Multi-Krimp technique may be used to detect anomalies. In a given code table, the feature sets with short code words corresponding to high usage represent the patterns in the data that can effectively compress the majority of data points. In other words, these feature sets capture the patterns summarizing the norm of the data. On the other hand, feature sets with longer code words are rarely used and thus encode the sparse regions in the data. Consequently, the data points in a database can be scored by their encoding cost for anomalousness.

FIG. 5 illustrates a methodology 500 for anomaly detection. Given a set of data, one or more code tables are built 501. The code tables may be built using the Multi-Krimp technique described above.

One or more clusters are then established 502 for the set of data. The Multi-Krimp technique described above may be used for cluster detection. Each point in a database is encoded with a collection of feature sets from each code table. The feature sets used in the encoding of a data point are referred to as the cover. Clusters can be detected based on the similarity or overlap between the cover of a group of data points. Clusters may be detected for groupings of data points in different contexts as well. For example, clusters may be detected for different code tables, which is referred to herein as contextual clustering.

FIG. 6 illustrates an example of contextual clustering. Given a data table 601 and a set of merged code tables 602-1 and 602-2, a matrix may be created for each of the code tables 602-1 and 602-2. Clustering matrix 603-1 corresponds to the code table 602-1. In this matrix, there are two clusters 604-1 and 604-2, which correspond to the groups of data points which use each code word. For example, cluster 604-1 is a group of data points #1, #2 and #3 which cluster on the group of attributes ABC. Cluster 604-2 is group of data points #4, #5, #6 and #7 which cluster on the group of attributes ABD. Clustering matrix 603-2 corresponds to code table 602-2, and shows three clusters 605-1, 605-2 and 605-3 corresponding to attributes X, Y and Z, respectively.

Figure 7:
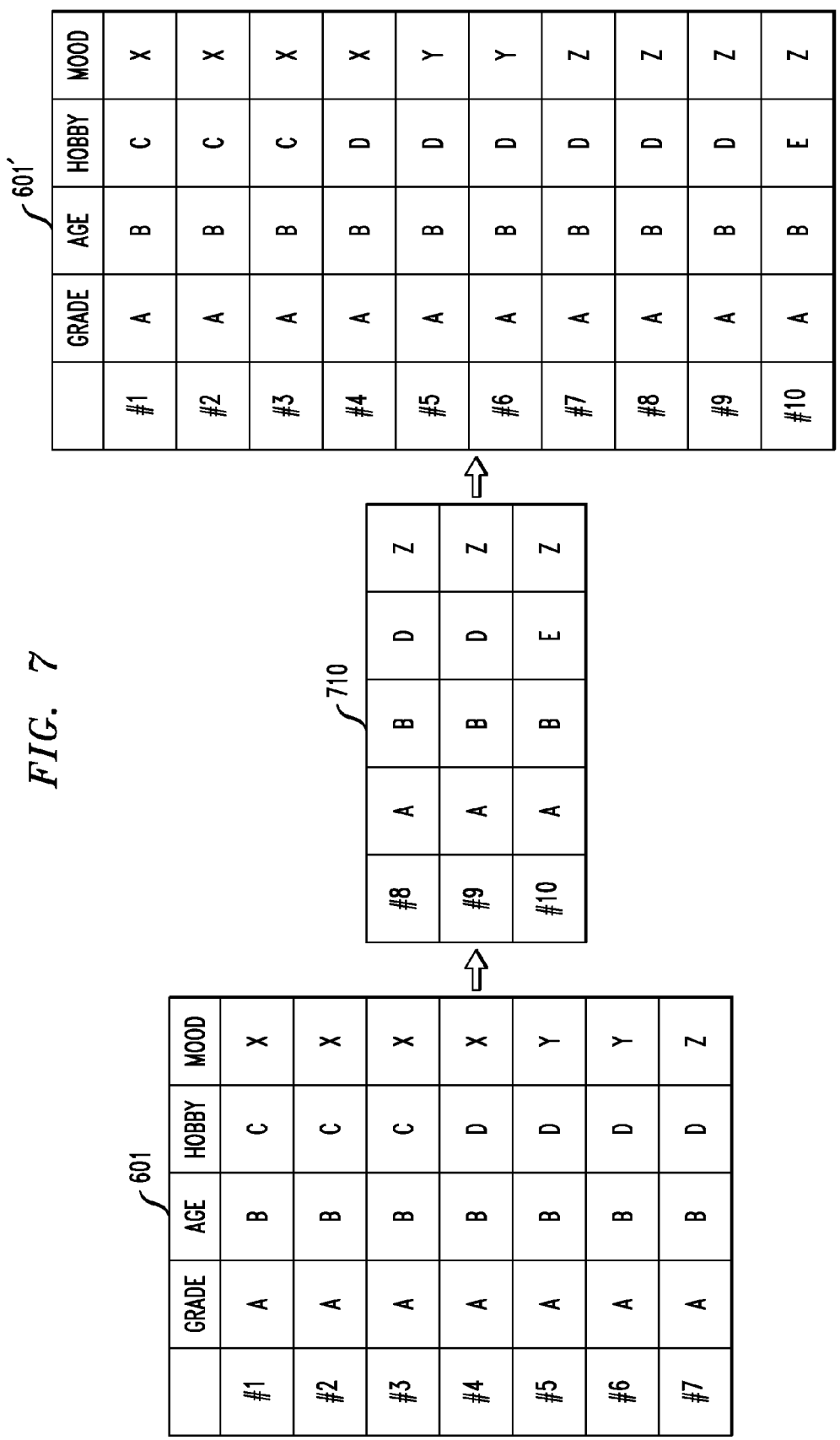
FIG. 7 illustrates an example of table update, according to an embodiment of the invention.

Returning to the methodology 500, new data is received 503. FIG. 7 shows an example of receiving new data. In this example, it is assumed that the existing set of data is the data table 601 shown in FIG. 6. New data, consisting of data points #8, #9 and #10 are received 710. The new data points are added to existing data table 601 to form an updated data table 601'.

For each new data point, the methodology 500 determines 504 if the data point is an anomaly. FIG. 8 illustrates a methodology 800 for anomaly detection. Given a set of code tables, a threshold compression cost $C_{thresh}$ is inferred 801. In one embodiment, $C_{thresh}$ may be based on the mean of compression costs for each data point in the database. For a given data point, the total compression cost $C_{total}$ is estimated 802. The methodology then compares 803 $C_{thresh}$ and $C_{total}$. If $C_{total} < C_{thresh}$, an anomaly is not detected 804. If $C_{total} > C_{thresh}$, an anomaly is detected 805. Steps 802-803 may be repeated for a number of data points, and then the process ends 806.

In some embodiments, $C_{total}$ may be computed as follows. Given a set of code tables $CT_1, \ldots, CT_k$ returned by the Multi-Krimp algorithm of FIG. 4, each data point d∈D can be encoded by one or more code words from each $CT_i$, i={1, . . . , k}. The corresponding feature sets constitute the cover of d as discussed above. The encoding cost of d, $C_{total}$, is then considered as its anomalousness score. A given data point is more likely to be an anomaly if it has a high anomalousness score because the anomalousness score corresponds to the compression cost of the given data point. An anomalousness score may be calculated as $$\text{score}(d) = \qquad (8)$$
$$L(d \mid CT) = \sum_{i \in 1,\ldots,k} L(d_{s_i} \mid CT_i) = \sum_{i \in 1,\ldots,k} \sum_{s \in \text{cover}(d_{s_i})} L(s \mid CT_i).$$

The scores of the data points can be computed and then sorted to report the top k data points with highest scores as possible anomalies. Detecting such data points with extreme or rare features in a given, static database is often referred to as "data filtering" or "data cleansing." Another task in anomaly detection is dynamically spotting anomalous data points that arrive over time. The Multi-Krimp compression method is quite flexible and can also handle dynamic data. For example, a newcoming data point d may be considered anomalous if its compression cost score(d) is more than three standard deviations away from the mean of the scores in the database. That is, $$\theta = \frac{1}{|D|} \sum_{\hat{d} \in D} \text{score}(\hat{d}). \qquad (9)$$

FIG. 9 shows a pseudocode algorithm which may be used to implement dynamic detection of anomalies. Given a set of code tables $C_1, \ldots, C_k$ and a new data point d, the compression cost of the new data point d is calculated using equation (8), above (FIG. 7, line 1). In the example algorithm of FIG. 9, if the score(d) (compression cost of the data point d) is greater than θ plus three times a standard deviation then a point is determined to be an anomaly. It is important to note that in other embodiments a different threshold may be used. For example, θ plus two times a standard deviation could be used. Numerous other examples are possible, and the threshold may be adjusted as required for a particular database or set of data. In the example algorithm of FIG. 9, if a data point is not an anomaly usages are updated and code word lengths are adjusted based on the updated usages (FIG. 9, lines 4-7).

Again returning to methodology 500, if a determination is made that given new data point is an anomaly, a new cluster is established 505. In some embodiments, a new code table is built if an anomaly is detected. If an anomaly is not detected, the methodology 500 determines 506 the cluster membership of the new data point. Existing code tables are then updated 507 to reflect the new data points. Steps 503-507 are repeated for each new data point, and the process ends 508.

FIG. 10 illustrates one example of updating code tables and determining cluster membership based on new data points. FIG. 10 uses the updated data table 601' shown in FIG. 7. The new data points #8, #9 and #10 are added to the set of data and thus the code tables built in step 501 are updated. In the example of FIG. 10, data point #10 is determined to be an anomaly. As such, code table 1002-1 is updated with a new code word ABE, shown with a usage of 1. Note that data points #8 and #9 with feature group ABD are also updated in code table 1002-1. The bit length of ABD is shorter in code table 1002-1 than in code table 602-1 to reflect the higher usage of ABD. Updated code table 1002-2 shows similar changes resulting from the addition of new data point #8, #9 and #10. FIG. 10 also shows updated cluster matrices 1003-1 and 1003-2 reflecting the changes in the data and code tables. For example, with respect to the grade, age and hobby features, data points #8 and #9 are added to the cluster 604-2 shown in FIG. 6. A new cluster 1004-3, corresponding to data point #10, is also shown. The cluster arrangements with respect to the mood feature are similarly updated.

Figure 11:
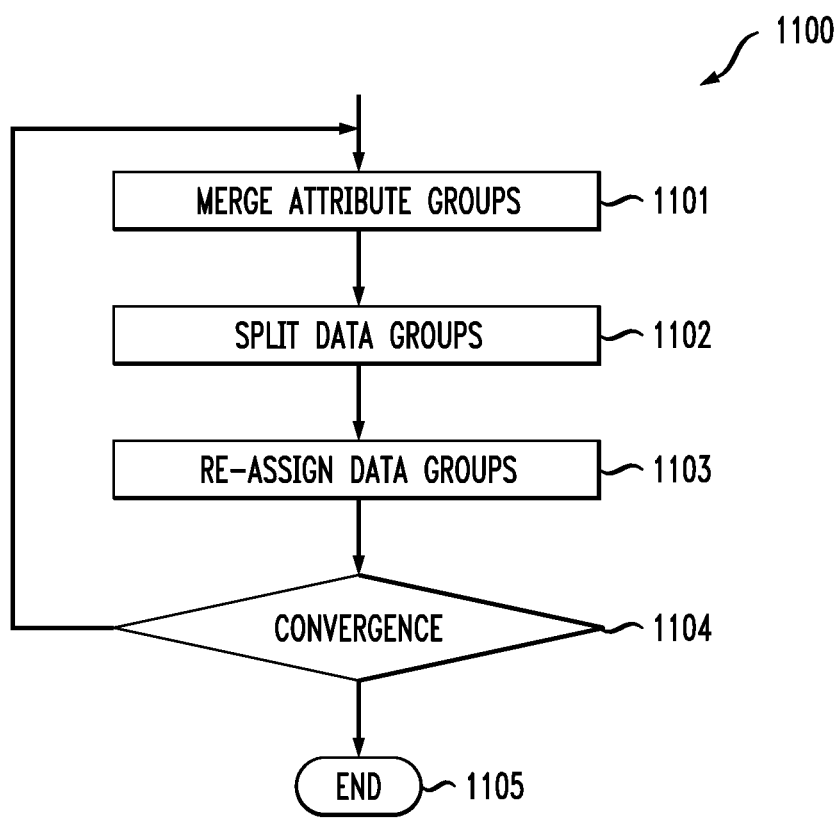
FIG. 11 illustrates a methodology for dynamic association detection, according to an embodiment of the invention.

The Multi-Krimp technique can also be used to exploit correlations among features of a database and partition features into groups. A separate code table is built for each group of features (attributes). A similar method may be used for data points to perform association detection, without necessarily building a set of code tables. FIG. 11 illustrates a methodology 1100 of association detection. Given a data table with one or more data groups and one or more attribute groups, two or more attribute groups are merged 1101. Next data groups are split 1102. The split data groups are then re-assigned 1103 to one of the attribute groups.

In some embodiments, the merging step 1101 of methodology 1100 is performed by sorting the attribute groups according to the information gain of each of the attribute groups and merging two or more attribute groups when a merged compression cost is less than the sum of the compression costs for the two or more attribute groups.

In some embodiments, the splitting step 1102 of methodology 1100 is performed by calculating an average compression cost for each of the data groups and splitting the data group with the highest average compression cost into one or more split data groups. The splitting step may further be performed by removing a given data point from one of the data groups if removal of the given data point lowers the average compression cost of the data group. The given data point may be assigned to the data group for which the compression cost of the given data point is minimized.

FIG. 12 shows one example of an algorithm, referred to as Co-Part, which can be used to implement the methodology of FIG. 11. The algorithm of FIG. 12 assumes that an embodiment of Multi-Krimp is used to create a set of code tables. As discussed above, however, the methodology of FIG. 11 is not limited for use solely with a set of code tables created using Multi-Krimp.

In the algorithm of FIG. 12A, a database consists of points that may be drawn from various distributions and thus can also be partitioned into groups. Co-Part finds both data and feature groups and builds a code table for each pair of such groups that gives a low MDL cost in bits. Co-Part alternates between merging on the feature mode and splitting on the data mode (FIG. 12A, lines 7-8). A bottom-up approach is used on the feature mode to exploit the information gain between the existing feature groups. On the other hand, a top-down approach is used on the data mode because the number of data points is often large and thus a bottom-up approach would be costly and only one data point in such an approach would not be representative enough to build any code table.

Co-Part first tries to find a pair of feature groups that would reduce the total cost when merged. One example of how to implement this approach is shown in the pseudocode algorithm of FIG. 12B. Next, it finds the data group with the highest average encoding cost and splits it into two by replacing those data points whose removal reduces the average cost to the new data group. One example of how to implement this approach is shown in the pseudocode algorithm of FIG. 12C. A new code table is built for the new data group while the other tables are updated. In the third step, the data points are shuffled among data groups; each is simply re-assigned to the data group with the set of code tables that gives the minimum encoding cost. One example of how to implement this approach is shown in the pseudocode algorithm of FIG. 12D.

In this step, existing code tables are updated and no new code tables are generated. These steps are repeated so long as the total cost keeps decreasing. Since the total encoding cost has a lower bound of zero, the algorithm is guaranteed to converge. The methodology of FIG. 11 and the algorithm of FIG. 12 may also be used to dynamically update associations. For example, the FIG. 11 methodology may simply be repeated when new data points are received.

It is important to note that one or more steps in FIGS. 4, 5, 8, 9, 11 and 12 and the methodologies described herein may be performed in parallel or in a different order. For example, steps 801 and 802 in FIG. 8 may be performed substantially simultaneously. Numerous other examples apply to the various steps in FIGS. 4, 5, 8, 9, 11 and 12 and the methodologies described herein.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but are not limited to, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-12, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-12, can also include, as described herein, providing a system, wherein the system includes distinct modules (e.g., modules comprising software, hardware or software and hardware).

Figure 13:
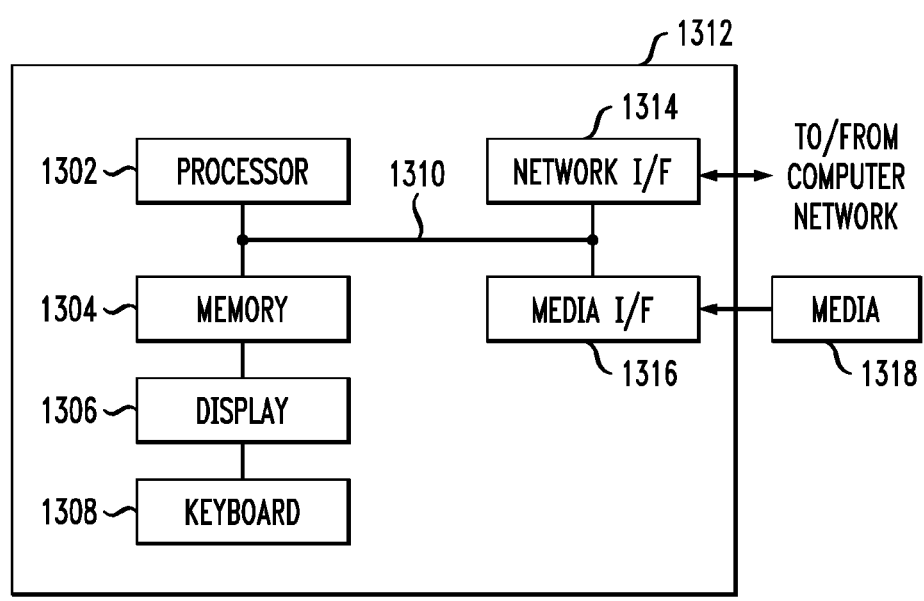
FIG. 13 illustrates a computing device in accordance with which one or more components/steps of techniques of the invention may be implemented, according to an embodiment of the invention.

One or more embodiments can make use of software running on a general purpose computer or workstation. With reference to FIG. 13, such an implementation 1300 may employ, for example, a processor 1302, a memory 1304, and an input/output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 1302, memory 1304, and input/output interface such as a display 1306 and keyboard 1308 can be interconnected, for example, via bus 1310 as part of data processing unit 1312. Suitable interconnections, for example, via bus 1310, can also be provided to a network interface 1314, such as a network card, which can be provided to interface with a computer network, and to a media interface 1316, such as a diskette or CD-ROM drive, which can be provided to interface with media 1318.

A data processing system suitable for storing and/or executing program code can include at least one processor 1302 coupled directly or indirectly to memory elements 1304 through a system bus 1310. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1308 for making data entries; display 1306 for viewing data; a pointing device for selecting data; and the like) can be coupled to the system either directly (such as via bus 1310) or through intervening I/O controllers (omitted for clarity).

Network adapters such as a network interface 1314 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 1312 as shown in FIG. 13) running a server program. It will be understood that such a physical server may or may not include a display and keyboard. Further, it is to be understood that components may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   building one or more code tables for each attribute in a set of data containing one or more attributes;
   establishing one or more clusters associated with one or more of the code tables;
   receiving one or more new data points;
   determining if a given one of the new data points is an anomaly; and
   updating at least one of the one or more code tables responsive to the determination;
   wherein at least one of the building, establishing, receiving, determining and updating steps are performed by a processor device.

2. The method of claim 1, wherein the building step comprises:
   counting a number of appearances of each attribute value;
   estimating a bit length required to compress each attribute value; and
   calculating a usage of each attribute value.

3. The method of claim 1, wherein each code table comprises a code word column, a bit length column and a usage column.

4. The method of claim 1, further comprising a step of assigning the given one of the new data points to an existing cluster when the given one of the new data points is determined not to be an anomaly.

5. The method of claim 4, wherein the step of assigning the given one of the new data points to an existing cluster comprises:
   calculating a compression cost of the given one of the new data points for each of the one or more clusters; and
   assigning the given one of the new data points to the cluster with a lowest calculated compression cost.

6. The method of claim 1, wherein the determining step comprises:
   estimating a threshold compression cost for each of the one or more clusters;
   calculating a compression cost of the given one of the new data points for each of the clusters; and
   comparing the compression cost of the given one of the new data points with the threshold compression cost for each of the one or more clusters;
   wherein a determination is made based on the comparison.

7. The method of claim 6, wherein when the compression cost of the given one of the new data points is greater than the threshold compression cost for each of the one or more clusters, the given one of the new data points is determined to be an anomaly.

8. The method of claim 1, further comprising a step of building a new code table and establishing a new cluster when the given one of the new data points is determined to be an anomaly.

9. The method of claim 1, wherein the step of updating the one or more code tables comprises:
   updating a usage and a bit length of each of the one or more code words;
   merging two or more of the clusters; and
   merging the code tables associated with merged clusters.

10. The method of claim 9, wherein the step of merging two or more of the clusters comprises:
  calculating a first compression cost of a first cluster and a second cluster;
  estimating a second compression cost of a merged cluster comprising the first cluster and the second cluster; and
  merging the first cluster and the second cluster when the second compression cost is less than the first compression cost.

11. The method of claim 1, further comprising a step of tracking detection of anomalies over a period of time.

12. The method of claim 11, wherein the determining step is based at least in part on tracked detection of anomalies.

13. The method of claim 1, wherein each of the one or more code tables corresponds to one or more attributes of the data set.

14. The method of claim 1, wherein the step of establishing one or more clusters comprises:
  creating a matrix of data and code words for each of the one or more code tables; and
  inferring at least one data cluster from at least one of the matrices.

15. The method of claim 14, wherein a data cluster is a group of data points associated with a given code word.

16. The method of claim 1, wherein the step of building one or more code tables comprises:
  receiving a set of data comprising one or more data groups and one or more attribute groups;
  merging two or more attribute groups to form one or more merged attribute groups;
  splitting a given one of the one or more data groups;
  assigning a given data point to one of the one or more data groups; and
  building a code table for each of the one or more attribute groups.

17. The method of claim 16, wherein the step of updating at least one of the one or more code tables comprises:
  merging two or more attribute groups to form one or more merged attribute groups;
  splitting a given one of the one or more data groups;
  assigning a given data point to one of the one or more data groups; and
  updating at least one code table responsive to the assignment.

18. The method of claim 1, wherein each of the one or more code tables corresponds to a group of attributes.

19. An article of manufacture comprising a non-transitory computer readable storage medium for storing computer readable program code which, when executed, causes a computer to:
  build one or more code tables for each attribute in a set of data containing one or more attributes;
  establish one or more clusters associated with one or more of the code tables;
  receive one or more new data points;
  determine if a given one of the new data points is an anomaly; and
  update at least one of the one or more code tables responsive to the determination.

20. An apparatus comprising:
  a memory; and
  a processor device operatively coupled to the memory and configured to:
  build one or more code tables for each attribute in a set of data containing one or more attributes;
  establish one or more clusters associated with one or more of the code tables;
  receive one or more new data points;
  determine if a given one of the new data points is an anomaly; and
  update at least one of the one or more code tables responsive to the determination.

* * * * *